OHMMETER HAVING A CONSTANT CURRENT SOURCE INCLUDING PHOTOVOLTAIC CELL
Filed July 18, 1963
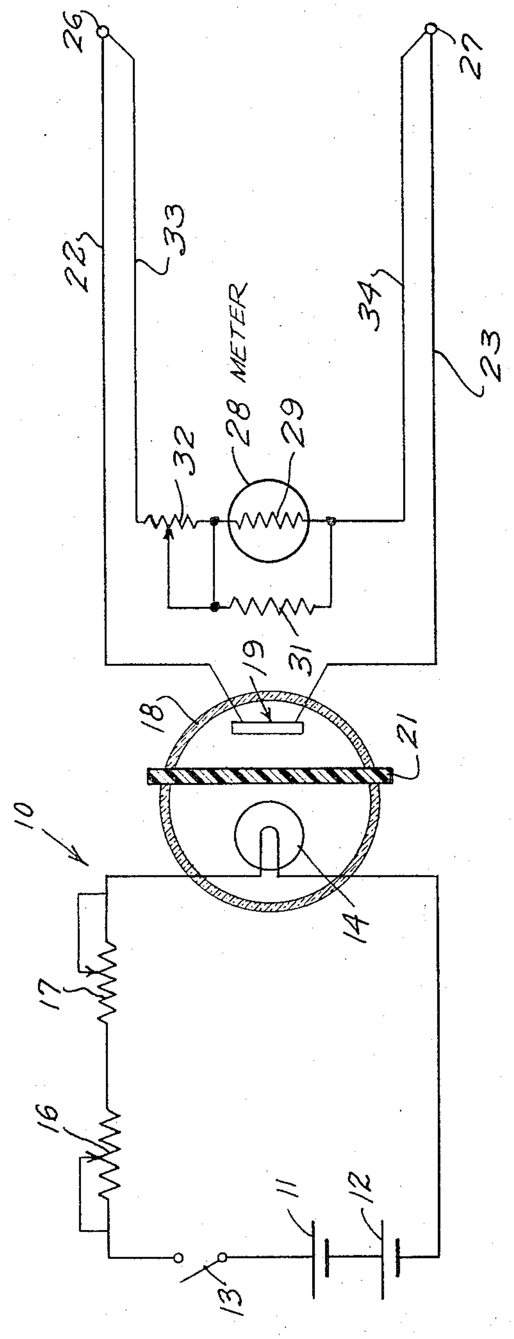
INVENTOR.
John A. Wereb, Jr.
BY
Hill, Sherman, Meroni, Gross & Simpson
ATTORNEYS

United States Patent Office 3,365,662
Patented Jan. 23, 1968

3,365,662

OHMMETER HAVING A CONSTANT CURRENT SOURCE INCLUDING PHOTOVOLTAIC CELL

John A. Wereb, Jr., Cleveland, Ohio, assignor to TRW Inc., a corporation of Ohio Filed July 18, 1963, Ser. No. 296,029
3 Claims. (Cl. 324—62)

The present invention relates to a low energy output ohmmeter particularly designed to measure accurately electrical resistances in sensitive or even explosive elements. Specifically, the ohmmeter is designed for use to check the electrical resistance of elements such as squibs, transistors, filaments in low voltage vacuum tubes, detonators, meters, and other sensitive elements which cannot tolerate a substantial electrical input from the measuring instrument.

Many attempts have been made for measuring extremely low resistances of sensitive devices, utilizing a wide variety of circuits, based both on alternating current or direct current. These instruments, for the most part, are relatively complex, require close mechanical tolerances, and are frequently subject to drift during operation. One such instrument employed a transformer to transform the impedances of the delicate elements to a level compatible with a photovoltaic cell source when used as a voltage generator. This type of instrument was difficult to stabilize against the environment and very difficult to adapt to a production line manufacturing technique.

The present invention provides a direct current type device using a photocell as a constant current generator rather than as a voltage generator and provides comparative simplicity, good stability, greater accuracy, and adaptability to large scale production techniques.

An object of the present invention is to provide an improved low energy output ohmmeter employing a photovoltaic cell as a constant current generating device.

Still another object of the invention is to provide an ohmmeter for measuring low resistances accurately and employing greatly simplified circuitry as compared with devices which have employed photovoltaic cells previously.

Still another object of the invention is to provide an ohmmeter of improved stability and resistance to drift.

A further object of the invention is to provide a mechanically rugged system employing a photovoltaic cell which reduces the necessity for close mechanical tolerances in manufacture.

Another object of the invention is to provide an ohmmeter circuit of low output in which the effects of lead resistances in the probe have been minimized.

Other objects and features of the present invention will be apparent from the following detailed description of the single figure of the drawing in which there is illustrated a preferred embodiment of the present invention.

The drawing illustrates an ohmmeter device 10 energized by a D.C. source which may consist of a pair of batteries 11 and 12 in series. Energization of the ohmmeter circuit is controlled by the operation of a switch 13 in the energizing circuit. The batteries 11 and 12 are used to energize a lamp 14 through a pair of variable resistances 16 and 17 connected in series with the batteries 11 and 12 and with the lamp 14.

The lamp 14 is contained within a housing 18 which also contains a photovoltaic cell 19. Interposed between the lamp 14 and the photovoltaic cell 19 is a barrier 21 preferably composed of a transparent plastic material. By putting the lamp 14 and the photovoltaic cell 19 in a photometric white chamber, battery power is reduced, lamp life is prolonged, and mechanical tolerances on the illumination system are eliminated. The barrier 21 acts as a separator to provide the physical isolation which is desired in the circuit to keep the battery circuit physically apart from the meter circuit. The white chamber is simply an enclosure which reflects and diffuses the light from the lamp 14 internally so that most of the light from the lamp 14 reaches the photovoltaic cell 19 and illuminates it fairly uniformly. Laboratory tests have shown that less than a 10% change occurs in the reading on the meter regardless of the relative positions of the lamp 14 and the photovoltaic cell 19. The dimensions of the enclosure are not critical. A high quality flat white paint is preferably employed on the internal wall of the enclosure 18. The arrangement is preferably such that the lamp 14 may be replaced externally from the chamber.

The output of the photovoltaic cell 19 is transmitted by means of a pair of conductors 22 and 23 to a pair of terminals 26 and 27 across which the unknown resistance to be measured is placed.

The resistance reading is taken from a meter 28 having an electric resistance denoted by a resistor 29 in the circuit diagram. A shunt resistor 31 is connected in parallel with the meter 28 to assure that there will be a sufficient deflection of the meter indicator when a resistance falling within the range of resistances to be measured is applied across the terminals 26 and 27. A variable calibrating resistor 32 is connected in series with the meter 28 to assist in adjusting the initial calibration of the circuit. A pair of conductors 33 and 34 connect the opposite ends of the resistor 32 and the meter 28 to the terminals 26 and 27, respectively.

When the switch 13 is closed, the lamp 14 illuminates the photovoltaic cell 19 causing a constant current to flow in the leads 22, 23, 33 and 34. Resistors 16 and 17 are used to control the brilliancy of the lamp 14 and thereby control the value of the constant current. When an unknown resistor is put across the terminals 26 and 27, it will shunt part of this constant current from the meter circuit consisting of leads 33 and 34 and the resistors 29, 31 and 32. The meter reading then will be a direct measure of the resistance across the terminals 26 and 27.

The following table lists particular circuit values which have been employed in an instrument produced according to the present invention:

| | |
|---|---|
| Batteries **11** and **12** | 1.5 v. each. |
| Resistors **16** and **17** | Total of 6 to 12 ohms. |
| Resistance **29** | About 10 ohms. |
| Resistor **31** | 9 ohms. |
| Resistor **32** | 0.1 to 0.5 ohm. |

When any battery or/and lamp combination is inserted, either in production or in servicing, the resistor 17 is set to its high range on the high brillance side. A load equal to twice the meter circuit resistance is connected to the meter leads, and resistor 16 is adjusted to give a full scale deflection on the meter. This adjustment then prevents the lamp illumination from ever becoming too high as the control of resistor 16 is limited to about plus or minus 50% or less of the illumination. The resistor 16 is then locked in place.

Under the circuit conditions illustrated in the table, the meter circuit, when properly balanced, will have a short circuit of about 2.0 milliampers. When resistor 17 is adjusted to give maximum brillance and cause the indicator on the meter to strike the pin on the high side, the short circuit current will never exceed about 3.0 milliamperes. Hence, the meter will be completely safe to use on any hazardous circuit which can tolerate a 3 milliampere current.

From the foregoing, it will be understood that the ohmmeter of the present invention has several distinct advantages, including a greatly simplified circuitry, an improved stability with respect to drift, and freedom from mechanical tolerance considerations.

It should also be evident that various modification can be made to the described embodiments without departing from the scope of the present invention.

I claim as my invention:

1. A low energy output ohmmeter comprising a lamp, a direct current source energizing said lamp, variable resistance means in the energizing circuit for said lamp controlling the energy input into said lamp, a photovoltaic cell fixedly secured at a fixed distance from said lamp receiving the light output from said lamp, means defining a photometric white chamber enclosing said lamp and said photovoltaic cell, a transparent barrier interposed between said lamp and said photovoltaic cell, a meter, a calibrating resistance in series with said meter, a pair of electrical conductors connecting the output of said photovoltaic cell across said meter and calibrating resistance, and terminals for applying an unknown resistance across said conductors.

2. A low energy ohmmeter comprising a lamp, a direct current source energizing said lamp, variable resistance means in the energizing circuit for said lamp controlling the energy input into said lamp, a photovoltaic cell fixedly secured at a fixed distance from said lamp receiving the light output from said lamp, a meter, a calibrating resistance in series with said meter, a pair of terminals arranged to receive an unknown resistance thereacross, a first pair of conductors connecting the constant current output of said photovoltaic cell to said terminals, and a second pair of conductors connecting said terminals across the combination of said meter and said calibrating resistor.

3. A low energy output ohmmeter comprising a lamp, a direct current source energizing said lamp, variable resistance means in the energizing circuit for said lamp controlling the energy input into said lamp, a photovoltaic cell fixedly secured at a fixed distance from said lamp receiving the light output from said lamp, means defining a photometric white chamber enclosing said lamp and said photovoltaic cell, a transparent barrier interposed between said lamp and said photovoltaic cell, a meter, a calibrating resistance in series with said meter, a pair of terminals arranged to receive an unknown resistance thereacross, a first pair of conductors connecting the constant current output of said photovoltaic cell to said terminals, and a second pair of conductors connecting said terminals across the combination of said meter and said calibrating resistor.

References Cited

UNITED STATES PATENTS

| | | | |
|---|---|---|---|
| 2,471,001 | 5/1949 | Miller | 324—62 |
| 2,492,459 | 12/1949 | Bondurant | 324—62 |
| 2,821,681 | 1/1958 | Baker | 324—62 |
| 3,102,227 | 8/1963 | DeGier | 350—209 |

OTHER REFERENCES

Stout: Basic Electrical Measurements, Prentice-Hall, Inc., 1950, p. 57.

RUDOLPH V. ROLINEC, *Primary Examiner.*

WALTER L. CARLSON, *Examiner.*

W. H. BUCKLER, E. E. KUBASIEWICZ, *Assistant Examiners.*